May 3, 1927.

L. D. SOUBIER

GLASS FEEDER

Filed April 28, 1923

INVENTOR

Leonard D. Soubier

By J. F. Rule.

His attorney.

May 3, 1927.

L. D. SOUBIER

GLASS FEEDER

Filed April 28, 1923

INVENTOR
Leonard D. Soubier
BY J. F. Rule
HIS ATTORNEY

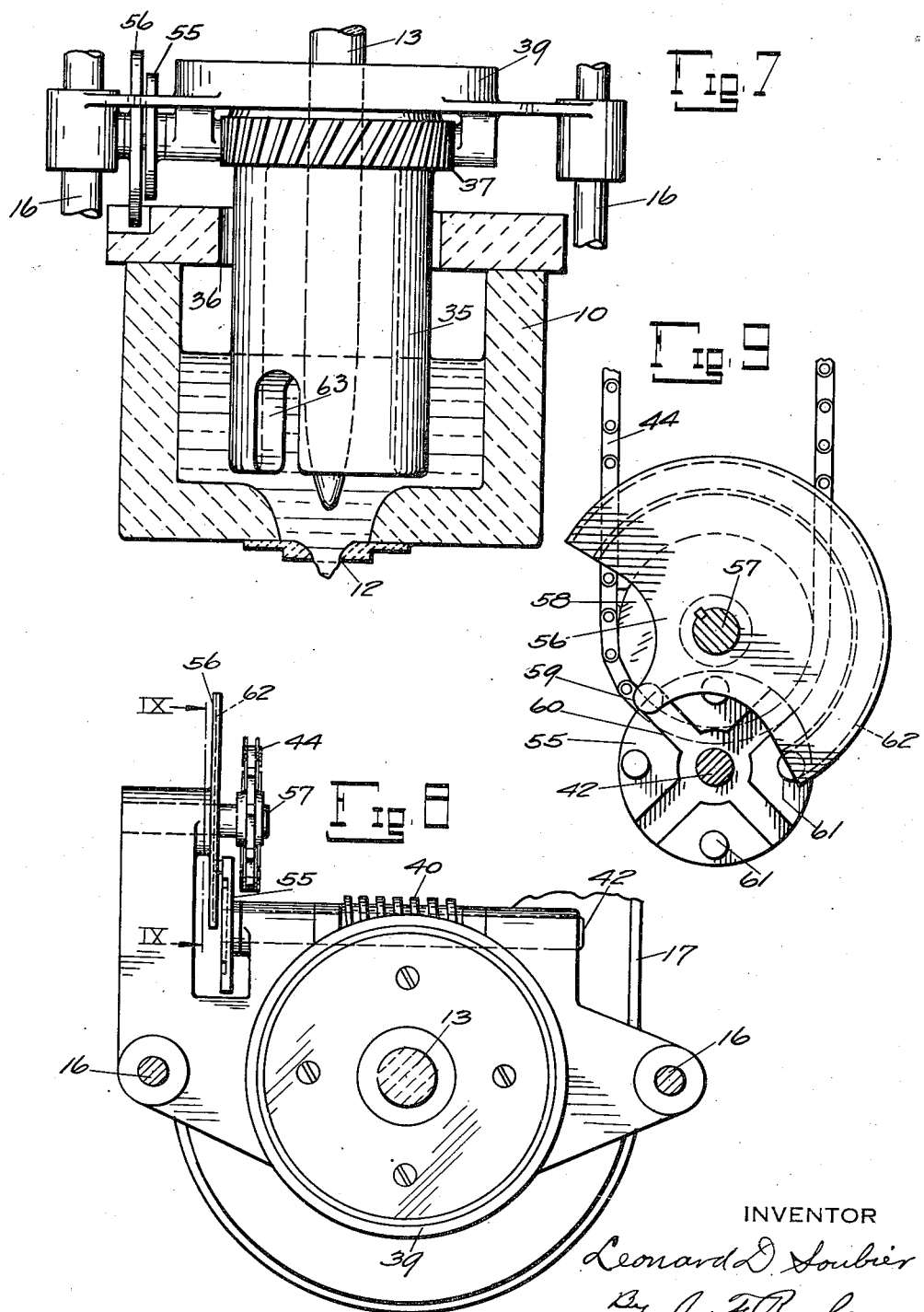

Patented May 3, 1927.

1,626,705

UNITED STATES PATENT OFFICE.

LEONARD D. SOUBIER, OF TOLEDO, OHIO, ASSIGNOR TO THE OWENS BOTTLE COMPANY, OF TOLEDO, OHIO, A CORPORATION OF OHIO.

GLASS FEEDER.

Application filed April 28, 1923. Serial No. 635,212.

My invention relates to glass feeders for shaping and delivering charges of molten or plastic glass. The invention is herein shown in connection with a feeder of the type in which a receptacle for the glass is provided with an outlet opening in the bottom thereof and a regulator or plunger is arranged to extend downward into the glass over the outlet and reciprocates vertically to control the discharge. In such feeders, the glass enters the receptacle at one side of the plunger and there is always a tendency for the moving glass to establish a one sided flow through the outlet so that the glass on the opposite side of the plunger becomes comparatively cold and stagnant. This results in cold streaks or unevenness in temperature and lack of homogeneity in the issuing glass, with consequent defects in the finished ware.

An object of my invention is to provide practical means for producing a rotary circulation of the glass around the outlet, thereby overcoming the above noted objections by maintaining a uniform temperature and homogeneity of the issuing glass. For this purpose, I provide a circulating or stirring device, which may be in the form of a sleeve surrounding the plunger and projecting downward into the glass above the outlet. Means are provided for maintaining a continuous rotation of the stirring device about the vertical axis of the outlet opening.

The present application discloses subject matter also disclosed in my co-pending applications as follows, namely: Serial Number 567,533, filed June 12, 1922; Serial Number 675,261, filed Nov. 17, 1923; Serial Number 684,296, filed Jan. 4, 1924; Serial Number 690,408, filed Feb. 4, 1924; Serial Number 710,488, filed May 2, 1924; Serial Number 100,231, filed April 7, 1926.

Figure 1:
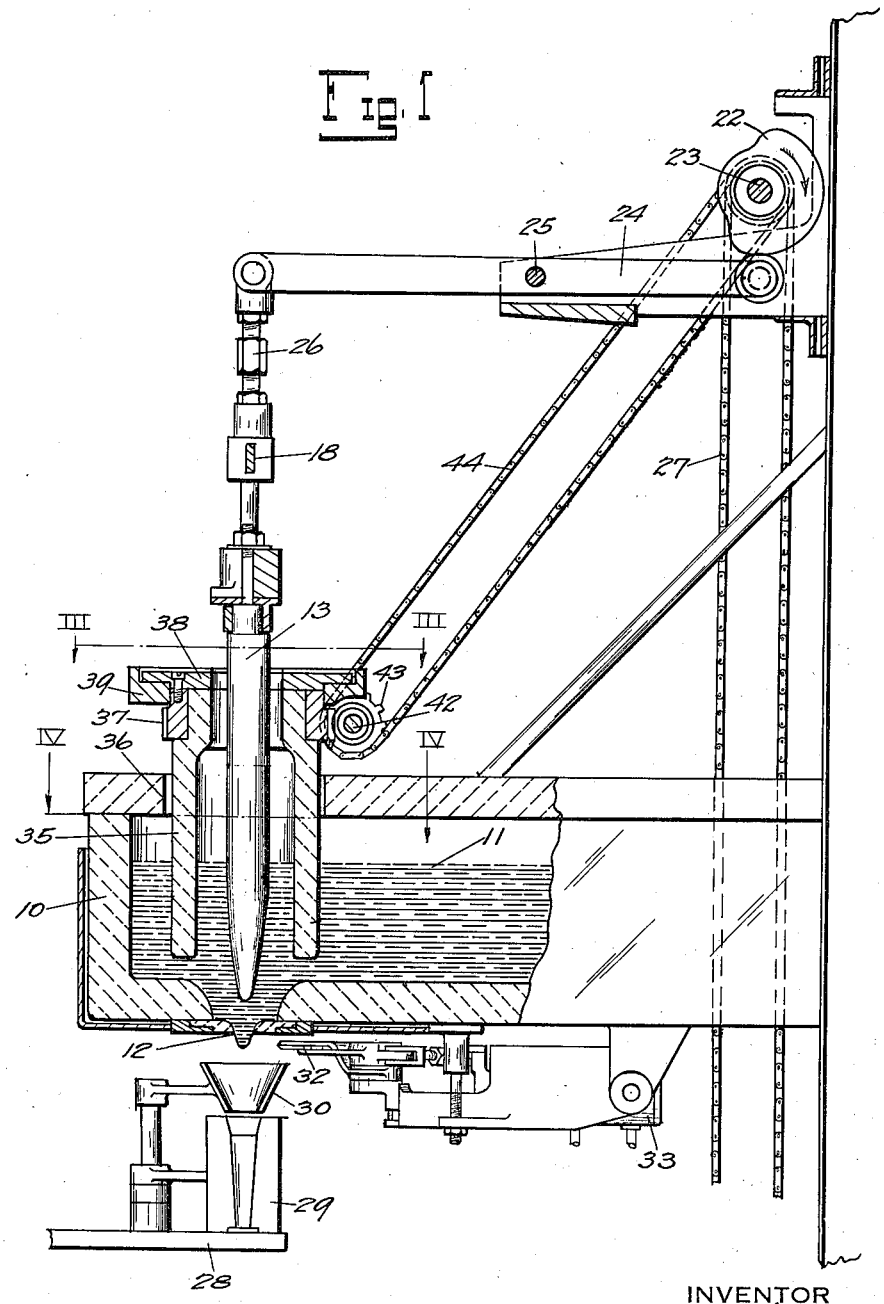
Figure 1 is a part sectional elevation of a glass feeder embodying the present invention.
Figure 2:
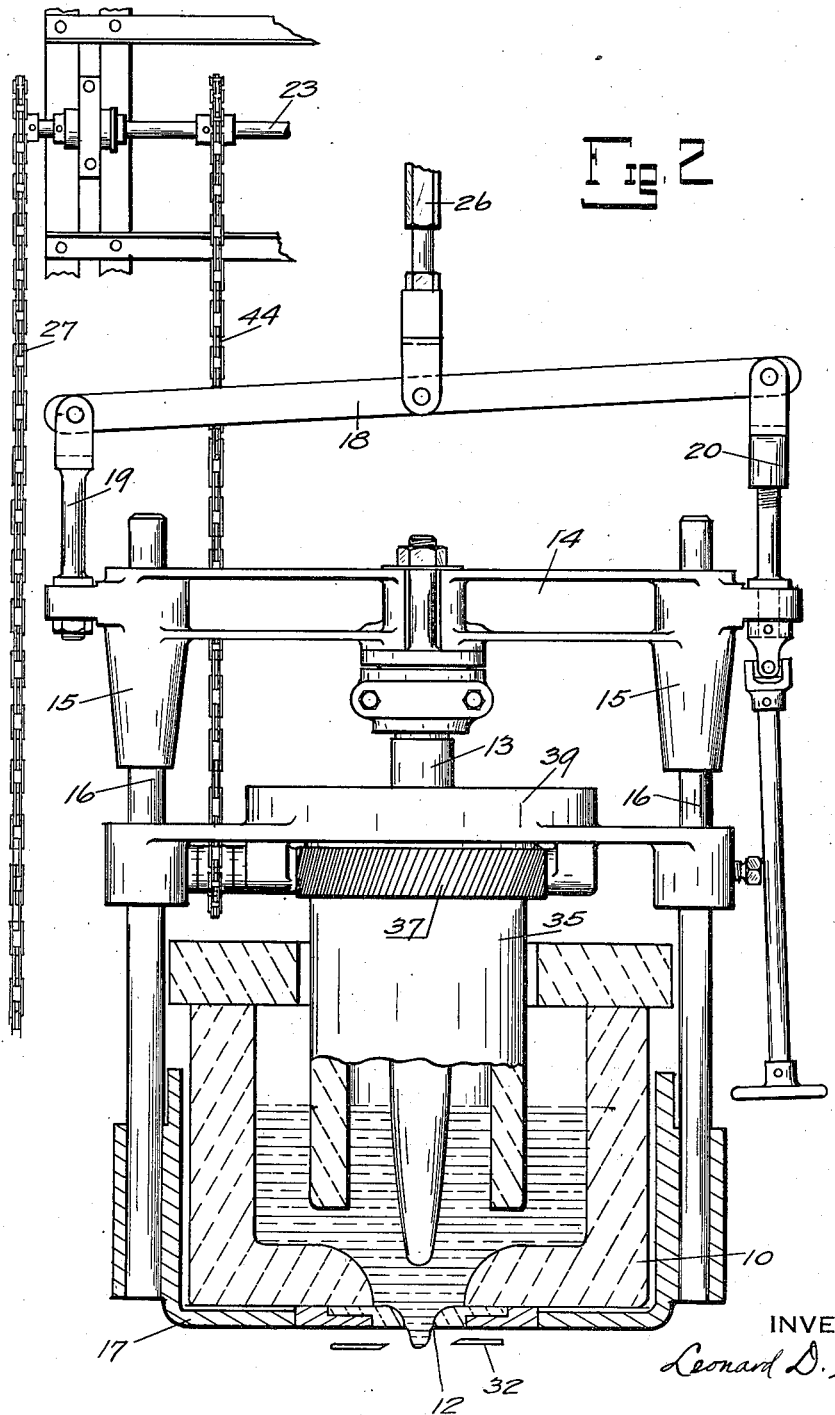
Figure 2 is a part sectional front elevation of the same on a larger scale.
Figure 3:
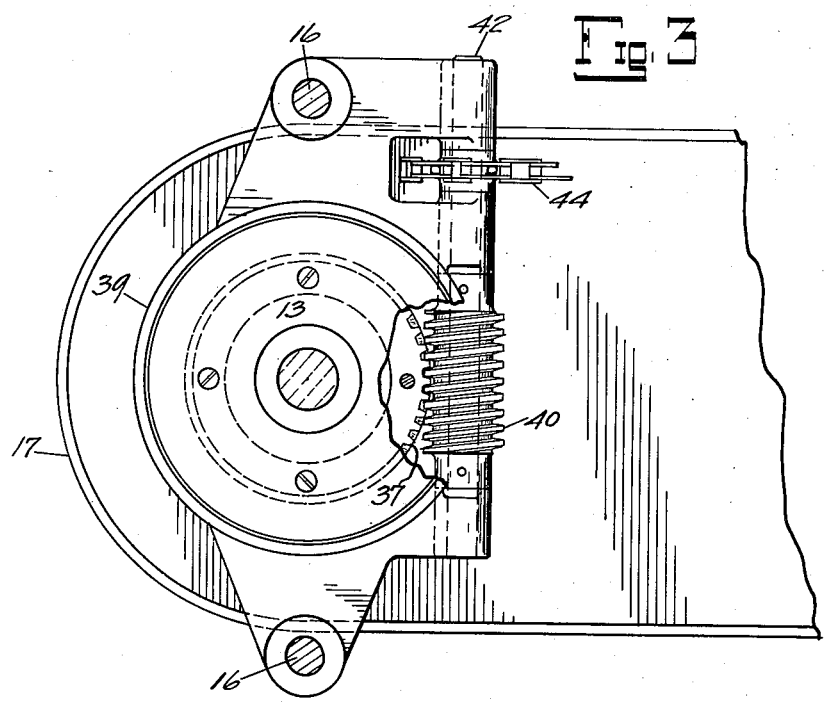
Figure 3 is a sectional plan at the line III—III on Figure 1.
Figure 4:
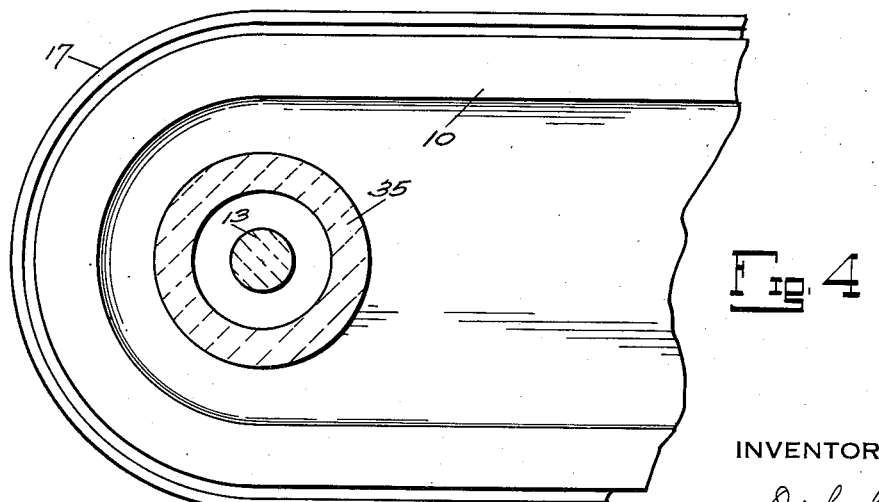
Figure 4 is a section at the line IV—IV on Figure 1.

Figures 7, 8 and 9 illustrate a further modification including means for rotating the stirring device intermittently. Figure 7 is an elevation of the same, the furnace boot being shown in section. Figure 8 is a top plan view. Figure 9 is a sectional elevation at the line IX—IX on Figure 8, showing the Geneva movement.

A receptacle 10 is herein shown as the usual furnace boot or forehearth into which molten glass 11 enters from the furnace. The glass issues from an outlet 12 in the bottom of the receptacle, the movement of the glass through said outlet being controlled by a vertically reciprocating regulator in the form of a plug or plunger 13, which may be of usual construction and operation. The plug is mounted in a yoke 14, provided at its ends with bearing sleeves 15 which slide up and down on standards 16, projecting upward from the frame 17 which supports the boot 10. A bar 18 is pivoted at one end to a post 19 at one end of the yoke 14. The other end of said bar has an adjustable connection 20 with the corresponding end of the yoke. The plunger 13 is operated by a cam 22, fixed to a continuously rotating drive shaft 23, said cam operating through a lever 24, pivoted at 25, and having an adjustable link connection 26 with the bar 18.

The shaft 23 is driven by a sprocket chain 27, running over a sprocket wheel on the shaft 23. Said chain is preferably driven from the glass forming machine to which the charges of glass are supplied from the feeder. Said machine comprises a mold table 28, carrying molds 29, which, as the mold table rotates, are successively brought to a charging position directly beneath the outlet 12. Funnel guides 30 may be provided on the mold carriage for directing the glass into the molds. A pair of shears 32 are actuated by an air motor 33, operated in synchronism with the movements of the plunger, for periodically severing the gobs of glass.

In order to cause the rotary circulation of the glass about the axis of the plunger and outlet opening, so that stagnation and chilling of the glass in front of the plunger is prevented and an even temperature and homogeneity of the issuing glass is maintained, the following mechanism is provided:

A stirring device 35 in the form of a hollow cylinder or sleeve projects downward through an opening 36 in the upper part of the boot into the molten glass above the outlet. This sleeve is formed of clay or other refractory material. Secured to the upper end of the sleeve is a worm gear ring 37 to which is attached a bearing plate or disk 38. The latter is seated in a stationary bearing ring 39, mounted on the standards 16 and vertically adjustable thereon. A worm 40, secured to a shaft 42, meshes with the worm gear 37. A sprocket wheel 43, fixed to the shaft 42, is driven by a sprocket chain 44 which in turn is driven from the shaft 23.

The operation will be understood from the foregoing description, but may be briefly summarized as follows:

The shaft 23 is driven continuously from the glass forming machine and through the cam 22 and lever 24, periodically moves the plug 13 up and down in synchronism with the movements of the molds 29 into charging position, thereby controlling the issuance of the glass from the outlet 12 and its formation into suspended gobs or charges which are periodically severed by the shears 32. The drive shaft 23 also operates through the sprocket chain 44, worm 40, and gear 37, to continuously rotate the stirring device or sleeve 35. This causes a continuous rotary circulation of the glass issuing from the outlet 12, so that the accumulation of cold glass or dog metal in front of the plunger is prevented, and a symmetrical flow of glass is maintained at the outlet which is free from cold streaks or unevenness in temperature.

Figure 5:
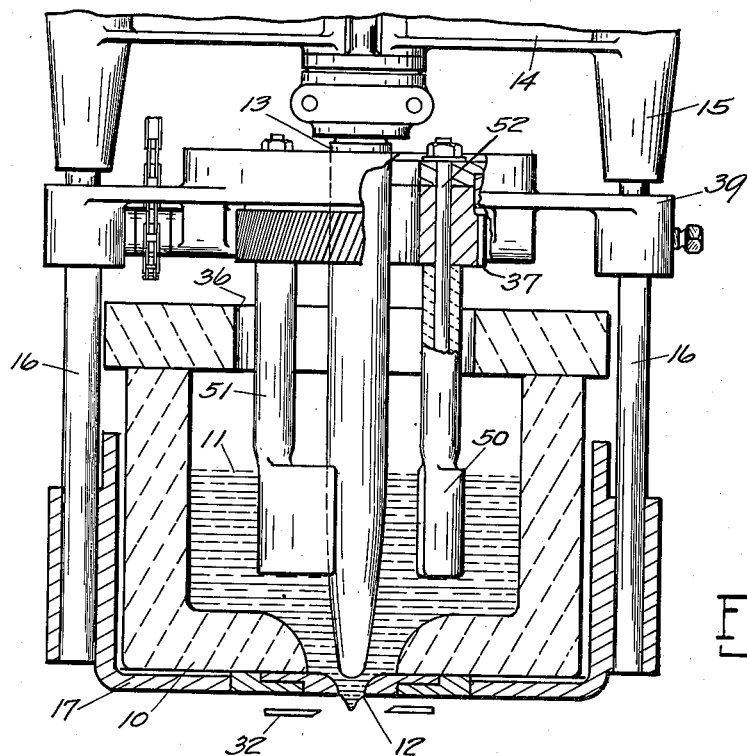
Figure 5 is a view similar to Figure 2, of a modified construction.
Figure 6:
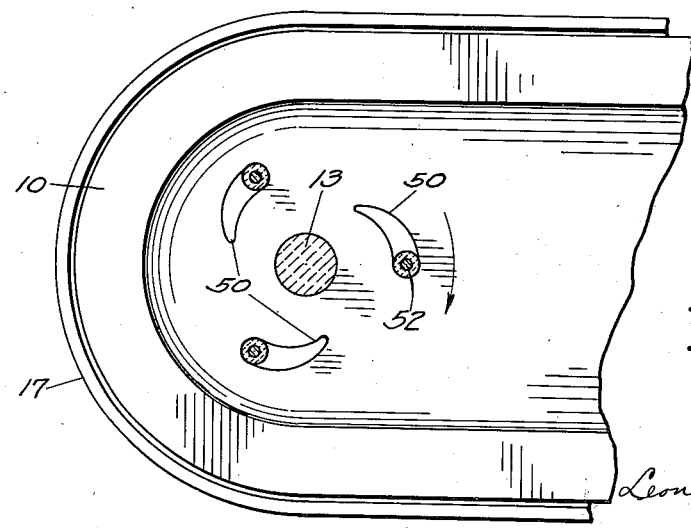
Figure 6 is a sectional plan of the same.

Figures 5 and 6 illustrate a modification in which a plurality of stirring devices 50 are employed in place of the tube 35 shown in Figures 1 to 4. These stirring devices or propellers 50 are formed at the lower ends of vertical stems 51 attached by means of bolts 52 to the ring gear 37. It will be understood that the number of propellers used may be greater or less than that shown, and their shape may be widely varied to meet varying conditions and to obtain varying results.

In the modification shown in Figures 7, 8 and 9, mechanism is provided for rotating the stirring device 35 intermittently. This mechanism comprises a Geneva movement, including a driven disk 55 fixed to the worm shaft 42, and a driving element 56 keyed to a shaft 57, on which is also mounted a sprocket wheel 58 over which runs the sprocket chain 44. As the member 56 rotates, a driving pin 59 thereon intermittently drives the disk 55, said pin working in radial grooves 60 formed in the disk 55. While the driving pin is out of engagement with the disk 55, the position of the latter is positively controlled by studs 61 on the disk which travel in an arc-shaped track or groove 62 in the driving member.

The stirring sleeve 35 is cut away or provided with one or more openings at 63 in the side wall thereof for the passage of glass to the outlet opening. The lower end of the sleeve is also brought down comparatively close to the floor of the boot so that the greater portion of the glass which is being discharged finds its way through the side opening 63.

Various modifications other than those herein shown may be resorted to within the spirit and scope of my invention.

What I claim is:

1. In a glass feeder, the combination of a container for molten glass having an outlet opening in the bottom thereof through which the glass issues, means for forming the issuing glass into mold charges comprising a regulator projecting over said opening and means for actuating said regulator periodically at regular intervals, a stirring device projecting into the glass at one side of the regulator, and means to cause said stirring device to move in a path surrounding said regulator.

2. In a glass feeder, the combination of a container having a discharge opening in the bottom thereof through which the glass issues in solid mass formation, a regulator operable to control the discharge of glass through said opening, means for periodically actuating said regulator, a stirring device within the glass in the container, and automatic means to move said stirring device relatively to the container and regulator in a path surrounding the regulator.

3. In a glass feeder, the combination of a container having a discharge opening in the bottom thereof through which the glass issues in solid mass formation, a regulator operable to control the discharge of glass through said opening, means for periodically actuating said regulator, a stirring device within the glass in the container, and means to continuously rotate said stirring device about the axis of said opening.

4. The combination of a container for molten glass having an outlet opening in the bottom thereof shaped to permit the glass to issue therethrough in solid mass formation, means for shaping and segregating the issuing glass into individual solid masses forming mold charges, a stirring device comprising a cylindrical member projecting downward into the glass above said outlet, said device being open at its lower end and having its interior diameter substantially greater than the diameter of the outlet opening, and means to rotate said device.

5. The combination of a container for molten glass having an outlet opening in the bottom thereof shaped to permit the glass to issue therethrough in solid mass formation, means for shaping and segregating the issuing glass into individual solid masses forming mold charges, a stirring device comprising a cylindrical member projecting downward into the glass above said outlet concentric with the vertical axis of said opening, said device being open at its lower end and having its interior diameter substantially greater than the diameter of the outlet opening, and means to continuously rotate said device about said vertical axis.

6. The combination of a container for molten glass having an outlet opening in the bottom thereof, a stirring device comprising a cylindrical member projecting downward into the glass above said outlet, said device being open at its lower end and having its interior diameter substantially greater than the diameter of the outlet opening, means to rotate said device, and a regulating plug extending downward through said device and movable up and down over the outlet to control the discharge of glass.

7. In a glass feeder, the combination of a receptacle to contain molten glass provided with a continuously open outlet opening in its bottom, a regulating plunger projecting downward into the glass over said opening, means to periodically move said plunger up and down, a sleeve surrounding said plunger and projecting downward into the glass, said sleeve being of substantially larger internal diameter than the diameter of the plunger, and means to effect a relative rotation of said sleeve and plunger.

8. In a glass feeder, the combination of a receptacle to contain molten glass provided with an outlet opening in its bottom, a regulating plug projecting downward into the glass over said opening, means to periodically move said plug up and down, and a sleeve surrounding said plug and projecting downward into the glass, said sleeve being of substantially larger internal diameter than the diameter of the plug, said sleeve being spaced from the floor of the receptacle to permit the passage of glass to said outlet and also providing an annular space for the glass within the sleeve and surrounding the plug, and means to rotate the sleeve.

9. In glass feeding apparatus, the combination of a container for molten glass having an outlet opening in the bottom thereof through which the glass issues in mass formation, means for periodically severing the issuing glass into individual mold charges, means for introducing glass into the container at one side of said opening, a sleeve projecting downward into the glass above the opening, the lower end of said sleeve being spaced from the floor of the container and providing a continuously open passageway for the glass flowing to the outlet opening, and means to effect a relative rotation of said sleeve and container for circulating the glass.

10. The combination of a container for molten glass having an outlet opening in the bottom thereof, a regulator in the glass above the outlet, a wall surrounding and spaced from said regulator, an opening in said wall to permit the passage of glass to the outlet opening, and automatic means for shifting said wall opening.

11. The combination of a container for molten glass having an outlet opening in the bottom thereof, a regulator in the glass above the outlet, a wall surrounding and spaced from said regulator, an opening in said wall to permit the passage of glass to the outlet opening, and automatic means to cause said wall opening to revolve about the vertical axis of said outlet opening.

12. The combination of a container for molten glass having an outlet opening in the bottom thereof, a regulator in the glass above the outlet, a wall surrounding and spaced from said regulator, an opening in said wall to permit the passage of glass to the outlet opening, and automatic means to rotate said wall about the axis of the outlet and thereby shift the position of the opening in the wall.

13. The combination of a container for molten glass having an outlet opening in the bottom thereof, a regulator in the glass above the outlet, a wall surrounding and spaced from said regulator, an opening in said wall to permit the passage of glass to the outlet opening, and automatic means to effect a relative rotation of said wall and container about the axis of the outlet opening.

14. In glass feeding mechanism, the combination of a receptacle for molten glass provided with a discharge orifice, means reciprocating within said receptacle for propelling the glass through said orifice, and a rotary stirring tool immersed in the glass within said receptacle and moving in a path surrounding said reciprocating means, for the purpose described.

15. The combination of a main furnace, a boot or trough extending forward therefrom and provided with a bottom outlet opening shaped to permit the glass to issue therethrough in a solid stream or column, means for periodically severing the issued glass to form individual mold charges, an implement projecting into the glass over the opening, means for periodically actuating said implement in synchronism with the operations of the severing means to control the discharge of glass through said opening, and means operating within the glass between said implement and the front of the boot for causing a circulation of the glass in front of said implement.

16. Apparatus for feeding molten glass comprising a container having a downwardly opening outlet, shears for severing mold charges from the glass issuing from said outlet, a vertical implement mounted for vertical reciprocation in said container above said outlet to control the issue of glass therethrough, a tubular member surrounding said implement, and means for causing a relative rotation between said tubular member and said container.

17. The combination of a non-rotary container for molten glass having a discharge outlet, a non-rotary plunger cooperating therewith to control the discharge of glass through the outlet, and a stirring implement projecting into the glass near the plunger and traveling in a closed path around the plunger.

18. The combination of a container having a discharge outlet in the floor thereof, an implement projecting downward into the glass and providing a restricted passageway between the lower end thereof and the floor of the container, said restriction being sufficient to restrict and control the flow of glass to the outlet, and means for moving said implement transversely through the glass and thereby stirring the glass.

19. The combination of a container having a discharge outlet in the floor thereof, an implement projecting downward into the glass and providing a restricted passageway between the lower end thereof and the floor of the container, said restriction being sufficient to restrict and control the flow of glass to the outlet, means for moving said implement transversely through the glass and thereby stirring the glass, and means for adjusting said implement up and down.

20. The combination of a container for molten glass having a bottom outlet opening, a stirring implement projecting downward into the glass and providing a wall surrounding the outlet, the lower end of said wall being spaced from the floor of a container to provide a restricted passageway through which the glass flows through the outlet, said restriction being sufficient to restrict and control the flow of glass to the outlet, means for rotating said stirring implement, and means for adjusting said implement toward and from the floor of the container.

21. In a glass feeder, the combination of a receptacle to contain molten glass and provided with an outlet opening in its bottom, a plunger projecting downward into the glass over said opening, means to periodically move said plunger up and down, a sleeve surrounding said plunger and projecting downward into the glass, said sleeve being of substantially larger internal diameter than the diameter of the plunger, the lower end of said sleeve being spaced from the floor of the receptacle to provide a restricted passageway through which glass flows to the outlet opening, means for adjusting said sleeve up and down to vary the restriction of the flow of glass, and means to effect a relative rotation of said sleeve and plunger.

22. In glass feeding apparatus, the combination of a container for molten glass having an outlet opening in the bottom thereof, means for introducing glass into the container at one side of said opening, a tubular member projecting downward into the glass above the opening and surrounding the axis of the opening, the lower end of said member being spaced from the floor of the container and providing a continuously open restricted passageway for the glass flowing to the outlet opening, means for adjusting said tubular member up and down for varying the size of said passageway, and means for effecting a relative rotation of said tubular member and container for circulating the glass.

23. The combination of a container for molten glass having a bottom outlet, a stirring device within the glass over the outlet, said device shaped and arranged to provide a glass containing chamber over the outlet and to permit the flow of glass into said chamber, automatic means for rotating said stirring device, and an implement reciprocating within the glass in said chamber to control the flow through the outlet.

24. The combination of a container for molten glass having a bottom outlet, a stirring device within the glass over the outlet, said device shaped and arranged to provide a glass containing chamber over the outlet and to permit the flow of glass into said chamber, automatic means for rotating said stirring device, adjusting means to adjustably restrict the flow of glass to said chamber, and an implement reciprocating within the glass in said chamber to control the flow through the outlet.

25. The combination of a container for molten glass having a bottom outlet, a stirring device within the glass in the container, means to move said stirring device in a path around the outlet and outside of the area directly over the outlet, and a plunger reciprocating in the glass over the outlet.

26. In a glass feeder, the combination of a container for molten glass having a bottom outlet opening, a non-rotating implement projecting downward in the glass over the outlet, means for periodically moving the implement up and down, a sleeve surrounding and spaced from said implement and extending downward in the glass, and means for rotating said sleeve.

27. The method of producing charges of molten glass suitable for subsequent shaping which comprises mechanically defining a mass of molten glass within a surrounding supply body of glass within a container while maintaining communication between said defined mass and the supply body, imparting a rotary motion to said mass, and periodically discharging a portion of said mass through an outlet in the container.

28. The method of producing charges of molten glass suitable for subsequent shaping which comprises mechanically defining a mass of molten glass within and forming part of a surrounding supply body of molten glass within a container, imparting rotary motion to said mass, periodically discharging portions of glass from said mass through an outlet in the container, severing said discharged portions, and maintaining continuous communication between the said defined mass and surrounding supply body, whereby the glass forming said mass is continually replenished from the surrounding supply body and maintained at substantially the same level as said supply body.

Signed at Toledo, in the county of Lucas and State of Ohio, this 26th day of April, 1923.

LEONARD D. SOUBIER.